Nov. 26, 1968    W. SEIFF    3,412,636
APPARATUS FOR CUTTING AND HANDLING VERY THIN FOILS
Filed June 13, 1966
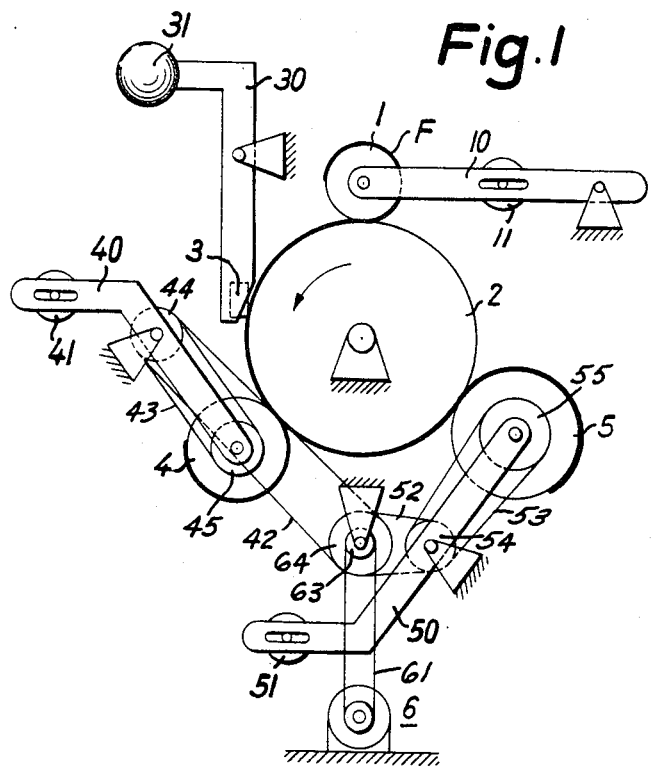
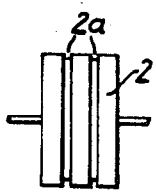
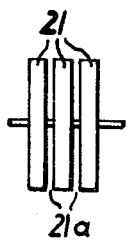
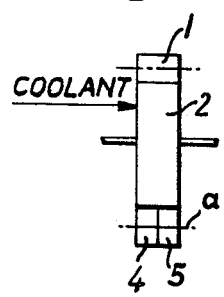
Inventor:
Werner Seiff
By Spencer & Kaye
Attorneys

United States Patent Office 3,412,636
Patented Nov. 26, 1968

3,412,636
APPARATUS FOR CUTTING AND HANDLING
VERY THIN FOILS
Werner Seiff, Berlin, Germany, assignor to Hydrawerk
Aktiengesellschaft, Berlin, Germany
Filed June 13, 1966, Ser. No. 556,925
Claims priority, application Germany, June 16, 1965,
H 56,316
6 Claims. (Cl. 83—107)

ABSTRACT OF THE DISCLOSURE

An apparatus for working very thin ribbon-shaped foil in which a supply roller and a take-up roller are mounted for rotation about axes parallel to the axis of a rotary drum and cause the foil to be looped about the drum. The rollers are pressed against the drum in such a way as to leave no free reach of foil between the rollers and the drum, so as to allow the foil to be cut while passing over and moving with the drum. According to one feature of the invention, the drum is constituted by a number of axially spaced-apart discs thereby forming interspaces that form one or more grooves which are axially aligned with respective cutting elements. According to another feature of the invention, there are two or more take-up rollers which take up respective strips into which the foil is cut, these take-up rollers being spaced circumferentially about the drum.

---

The present invention relates to an apparatus for handling very thin foils, and is especially suited for handling foils having a thickness of 4 $\mu$m (1 $\mu$m = $10^{-6}$ meter) or less.

While various existing apparatus allow ribbon-shaped foils to be worked, a number of difficulties have arisen when it came to handling extremely thin foils, and it is therefore the primary object of the present invention to provide an apparatus capable of handling such thin ribbon-shaped foils.

Accordingly, the present invention resides, basically, in an apparatus for working on very thin ribbon-shaped foil, which apparatus comprises a rotary drum and two roller means, one for supplying the foil to the drum and one for taking the foil off the drum. The two roller means are mounted for rotation about axes parallel to the axis of the drum and are spaced from each other in circumferential direction of the drum for guiding the foil to loop about the drum through a given looping angle. Means are provided for pressing the two roller means against the circumference of the drum, in consequence of which the foil rolls off the supply roller means and onto the drum, and off the drum and onto the take-up roller means, without there being any free reach of foil between the roller means and the drum, thereby to allow the foil to be worked on while the same passes over and moves with the drum, there being substantially no slippage between the foil and the parts over which the foil moves.

The foil is worked on at one or more stations along the circumference of the drum, which station or stations are between the points whereat the foil on the two roller means rolls onto and off the drum. This may be done by suitable tool means, as, for example, a cutter which cuts the ribbon into one or more narrower strips.

Additional objects and advantages of the present invention will become apparent upon consideration of the following description when taken in conjunction with the accompanying drawings in which:

FIGURE 1 is an elevational view of one embodiment of an apparatus according to the present invention.

FIGURE 2 is an end view of one embodiment of a rotary drum which may be used in the apparatus of FIGURE 1.

FIGURE 3 is an end view of another embodiment of a rotary drum which may be used in the apparatus of FIGURE 1.

FIGURE 4 is an end view showing a modification of the embodiment of FIGURE 1.

Referring now to the drawings, FIGURE 1 shows an apparatus for dividing a foil ribbon F into two or more narrower strips of foil. The thin ribbon is played out from a supply roller 1 from whence it runs over the rotary drum 2, where the ribbon is cut by means of one or more cutting elements 3, as, for example replaceable razor blades or other inexpensive mass-produced cutters. These cutting elements 3, if there be more than one, are spaced from each other in the direction of the axis of the drum 2, so that the original ribbon is cut into a number of narrower strips.

To facilitate the cutting action, the periphery of the drum 2 is provided with grooves 2a (FIGURE 2) which are axially aligned with the cutting elements. If desired, the drum may, as shown in FIGURE 3, be constituted by a number of discs 21 of suitable widths, these discs being spaced from each other so that the interspaces 21a between the discs constitute grooves into which the cutting elements may penetrate.

The cut strips are taken up on take-up rollers 4 and 5. While, the take-up reels may be mounted next to each other on a common axis $a$, as shown in FIGURE 4, experience has shown that, despite the somewhat higher construction costs, it is preferable if the take-up rollers are mounted on separate axes, e.g., on axles which are arranged one behind the other, considered in circumferential direction of the drum 2. This means that the rollers 4 and 5, which, in practice, will be rotated by a common drive motor 6, via suitable belt drives, will have to be operated in such a way as to exert slightly different pulling forces on the cut strips so that the same will continue to be pressed against the drum 2 until such time as the strips are wound onto the take-up rollers. As shown in FIGURE 1, the drive belts include a drive belt 61 running from the motor 6 to a pulley 63 which rotates with a twin pulley 64, a drive belt 42 running from one groove of the twin pulley 64 to one groove of a twin pulley 44 mounted on the pivot of lever 40 and another drive belt 52 running from the other groove of the twin pulley 64 to one groove of a twin pulley 54 mounted on the pivot of lever 50, a further drive belt 43 running from the other groove of twin pulley 44 to a pulley 45 which drives the roller 4, and yet another drive belt 53 running from the other groove of twin pulley 54 to a pulley 55 which drives the roller 5. Since the twin pulleys 44 and 45 are of the same diameter but the drive pulleys 45 and 55 are of different diameters, the rotational speeds imparted to the two pulleys 45 and 55, and hence the torque which these pulleys exert on the rollers 4 and 5 will be different. This, in turn, causes different pulling forces to be exerted on the strips being wound on the rollers 4 and 5. This independent mounting and driving of the individual take-up rollers also prevents the strips from interfering with each other, and also allows the take-up speeds to adjust themselves to any difference in the thickness of the foil.

It will thus be seen that the supply roller 1 which supplies the foil to the rotary drum 2 and the take-up roller means, constituted by the rollers 4 and 5, for taking the foil off the drum, are mounted for rotation about axes parallel to the axis of the drum 2, the supply roller on the one hand and the take-up rollers on the other hand being spaced from each other in circumferential direction of the drum for guiding the foil about the drum through a given loop angle. If the take-up rollers are coaxial, as shown in FIGURE 4, the original foil will, throughout its entire width, loop throughout the same angle, whereas if the take-up rollers are spaced circumferentially apart, as shown in FIGURE 1, the original foil will loop about the drum through one angle for a portion of its width and through another angle for the remaining portion of its width. Obviously, the looping angle will differ even more if three or more strips are being cut from the foil and if three or more circumferentially spaced apart take-up reels are provided.

The rollers 1, 4 and 5, are shown, in FIGURE 1, as being carried by pivoted levers 10, 40 and 50, respectively, and the cutting means 3—which are arranged at a station along the circumference of the drum which is between the point whereat the foil passes from the supply roller to the drum and the point whereat the foil leaves the drum and is taken up by the respective take-up roller—as being carried by a pivoted lever 30. Each of the pivoted levers carries a respective weight 11, 31, 41, 51, so that the cutting elements 3 are gravity-biassed into proper cutting position and the rollers are gravity-biassed toward the drum. In this way, the foil on the various rollers—either being played out or being taken up—is pressed against the circumference of the drum, in consequence of which the foil rolls off the supply roller 1 and onto the drum 2, and off the drum 2 and onto the take-up rollers 4, 5, without there being any free reach of foil between the respective rollers and the drum. This allows the foil to be worked on while the same passes over the drum and moves with the drum in a substantially slip-free manner. That is to say, as the foil is transferred from one rotating part to another, there will be virtually no movement of the foil relative to any such rotating part. The drum itself acts as a platen and the greater the diameter and the looping angle, the better will the foil maintain contact with the drum and also, the larger will be the area available for working the foil. This means that the present invention can be used for operations other than cutting, e.g., the foil can be subjected to one or more other work steps, either in place of or in addition to the cutting step, such as the application of metallic or non-metallic coatings, the application of adhesives, imprinting, and so on. If desired, the entire apparatus may be operated in a vacuum, which would allow vapor deposition processes to be used; in the latter event, the drum may be fashioned as a cooling drum capable of receiving a coolant, as shown schematically in FIGURE 4.

In practice, the rollers and drum will be made of light metal so as to reduce the masses involved. This is of significance in view of the extreme thinness of the foil being worked.

The present invention is not limited to the use of gravity-biassed pivoted levers, in that other means may be used for pressing the cutting means toward the foil and for pressing foil on the rollers against the drum. For example, suitable spring devices may be utilized.

The present invention is particularly suited for working extremely thin foils, i.e., foils having a thickness of 4 $\mu$m. and less; the technological significance of this being the following:

In order to make electrical components such as capacitors and resistors even smaller, thinner and thinner strips and foils had to be used. Ultimately, a practical limit was reached, insofar as the thickness of conductive and semiconductive foils was concerned, in that it was not possible to make the foils thinner and still allow them to be self-supporting. However, in the case of non-conductive foils, and especially foils used as dielectrics, still thinner strips or good electrical characteristics and adequate mechanical strength were needed. The problem then arose that existing machinery could not handle such foils, so that it was not possible efficiently to work foils having a thickness of 4 $\mu$m. or less. It was to supply that need that the apparatus according to the present invention was developed, namely, an apparatus which handles the ribbon-shaped foils in such a manner that the foil is transferred from roller to drum and from drum to roller without there being any free or unsupported reach of material and with substantially no slippage of the foil with respect to the rollers and drum.

It will thus be seen that, in accordance with the present invention, there is provided a way of efficiently working very thin foils, including non-conductive foils, which allows such foils to be handled on a mass-production basis. The present invention therefore also makes possible the widespread use of such thin foils and makes practical the manufacture of articles constituted at least in part by foil worked on by the disclosed apparatus, e.g., capacitors.

It will be understood that the above description of the present invention is susceptible to various modifications, changes and adaptations, and the same are intended to be comprehended within the meaning and range of equivalents of the appended claims.

What is claimed is:

1. Apparatus for working on very thin ribbon-shaped foil, comprising, in combination:
   (a) a rotary drum;
   (b) supply roller means for supplying the foil to said drum and take-up roller means for taking the foil off said drum, said two roller means being mounted for rotation about axes parallel to the axis of said drum and being spaced from each other in circumferential direction of said drum for guiding the foil to loop about said drum through a given looping angle;
   (c) means for pressing said two roller means against the circumference of said drum, in consequence of which the foil rolls off said supply roller means and onto said drum, and off said drum and onto said take-up roller means, without there being any free reach of foil between said roller means and said drum, thereby to allow the foil to be worked on while the same passes over and moves with said drum;
   (d) tool means arranged along the circumference of said drum between the point whereat the foil on said two roller means rolls onto and off said drum, respectively, for working on the foil as the same passes over and moves with said drum, said tool means comprising at least one cutting element for cutting the foil into at least two strips; and
   (e) said drum comprising a plurality of axially spaced-apart discs, the interspace between consecutive discs constituting a respective groove, there being a respective groove for each cutting element, each groove being in axial alignment with its respective cutting element for receiving the same in the course of a cutting operation.

2. Apparatus for cutting very thin ribbon-shaped foil into strips, comprising, in combination:
   (a) a rotary drum;
   (b) supply roller means for supplying the foil to said drum and a plurality of take-up roller means, corresponding in number to the number of strips into which the foil is cut, for taking respective cut strips off said drum, said roller means being mounted for rotation about axes parallel to the axis of said drum, each take-up roller means being spaced from said supply roller means in circumferential direction of said drum for guiding the foil to loop about said drum through a given looping angle and said take-up roller means being spaced from each other in circumferential direction of said drum;
   (c) means for pressing said roller means against the circumference of said drum, in consequence of which the foil rolls off said supply roller means and onto said drum, and off said drum and onto said take-up roller means, without there being any free reach of foil between said roller means and said drum, thereby to allow the foil to be cut while the same passes over and moves with said drum; and (d) at least one cutting element arranged along the circumference of said drum between the points whereat the foil on said two roller means rolls onto and off said drum, respectively, for cutting the foil into at least two strips as the foil passes over and moves with said drum.

3. Apparatus as defined in claim 1 wherein each cutting element is constituted by a razor blade, the same being carried by a pivoted lever.

4. Apparatus as defined in claim 2 wherein means are provided for imparting different pulling forces to said take-up rollers.

5. Apparatus as defined in claim 2 wherein said drum is a cooling drum.

6. Apparatus as defined in claim 2 wherein said drum and said roller means are made of light metal.

References Cited

UNITED STATES PATENTS

| 2,705,049 | 3/1955 | Brooks | 83—434 X |
| 2,748,863 | 6/1956 | Benton | 83—171 |
| 2,970,535 | 2/1961 | Schmutz | 242—65 X |
| 2,984,427 | 5/1961 | Rockstrom | 242—65 |
| 3,251,252 | 5/1966 | Lefevre | 83—435 X |

FOREIGN PATENTS 511,770 11/1930 Germany.

WILLIAM S. LAWSON, *Primary Examiner.*